Feb. 8, 1966   D. W. BOSTWICK   3,234,552
AIRCRAFT RADIO NAVIGATION INSTRUMENT SYSTEM
Filed March 19, 1963   4 Sheets-Sheet 1

INVENTOR.
DUNBAR W. BOSTWICK
BY Darby & Darby
ATTORNEYS

Feb. 8, 1966  D. W. BOSTWICK  3,234,552
AIRCRAFT RADIO NAVIGATION INSTRUMENT SYSTEM
Filed March 19, 1963  4 Sheets-Sheet 2

INVENTOR.
DUNBAR W. BOSTWICK
BY Darby & Darby
ATTORNEYS

Feb. 8, 1966 D. W. BOSTWICK 3,234,552
AIRCRAFT RADIO NAVIGATION INSTRUMENT SYSTEM
Filed March 19, 1963 4 Sheets-Sheet 3

FIG. 6

INVENTOR.
DUNBAR W. BOSTWICK
BY Darby & Darby
ATTORNEYS

Feb. 8, 1966     D. W. BOSTWICK     3,234,552
AIRCRAFT RADIO NAVIGATION INSTRUMENT SYSTEM
Filed March 19, 1963     4 Sheets-Sheet 4

INVENTOR.
DUNBAR W. BOSTWICK
BY Darby & Darby
ATTORNEYS

United States Patent Office 3,234,552
Patented Feb. 8, 1966

3,234,552
AIRCRAFT RADIO NAVIGATION
INSTRUMENT SYSTEM
Dunbar W. Bostwick, Shelburne, Vt., assignor to Aviation Instrument Manufacturing Corp., Houston, Tex., a corporation of Texas
Filed Mar. 19, 1963, Ser. No. 266,358
9 Claims. (Cl. 343—107)

This invention relates to aircraft instruments and more particularly to aircraft instruments for use in an aircraft radio navigation system to establish course intercept points.

As the density of aircraft traffic increases, as well as the speed of these aircraft, the solution to the problem of navigation and flying in a safe and reliable manner becomes increasingly complex. This is especially true with respect to high density traffic areas existing near such places as airports. Here, aircraft navigation must be carried out in a precise and carefully controlled manner in order to avoid collisions between two aircraft.

In recent years a radio system has been adopted throughout this country, and in other countries, to aid the pilot in navigating his aircraft. This radio system is called the V.H.F. omnirange system. This system is also commonly referred to as VOR or omni and it is currently being used by the majority of military, commercial and private aircraft flying in this country. Each aircraft using omnirange navigation operates in conjunction with a selected one of a number of omnirange ground stations which is continually transmitting bearing information on separate assigned frequencies. This bearing information is in the form of two radio signals having a phase displacement therebetween which establishes a number of bearing radials corresponding to the 360 degrees points on a compass. An aircraft can navigate to a selected omnirange station by tuning to the frequency of the station, selecting the proper radial, as distinguished by its characteristic phase difference, and flying a course to the station using this radial as a homing guide.

When flying an aircraft with the aid of an omnirange system, the pilot selects an omnirange station and course to be flown to this station. An omnirange receiver is provided which receives the signals transmitted by the selected omnirange station. This receiver produces an output signal which is the resultant of the comparison between the selected course and the received omnirange signals. This resultant signal, sometimes called the course deviation signal, is used to operate an indicator or meter which tells the pilot to steer to the right or left in order to achieve the selected course.

While the course deviation signal operates the meter directly in many aircraft installations, particularly in smaller aircraft, other more sophisticated systems are used to provide the pilot with more accurate steering information. In a typical system of this type, the course deviation signal is first applied to a steering computer in the aircraft where it is mixed with aircraft attitude signals derived from the aircraft gyro or other attitude measuring device. The steering computer then produces a composite signal which is supplied to a steering pointer on the pilot's indicator telling him how to steer the aircraft to maintain the selected radio omni course. Many aircraft omni systems of this type are available commercially and are sold, for example, by such companies as Sperry Gyroscope Company of Great Neck, New York under the name of "Zero-Reader" and by Collins Radio Corporation of Cedar Rapids, Iowa under the general designation of the Collins Integrated Flight System. The present invention will operate with all of these systems whether or not they have a steering computer.

The aircraft's omnirange receiver and navigating system is also used to provide information in addition to that needed by the pilot to steer the aircraft on a selected radial course heading. One such additional use is to establish intercept points which are at some predetermined geographical location. These intercept points are usually established by intercepting radial signals from two separate omnirange station transmitters. When the aircraft reaches an intercept point the pilot is to perform some predetermined flight maneuver such as reporting the time the intercept point was reached, making a turn, bank or ascent or descent in altitude. These intercept points are commonly used, for example, in holding and approach patterns near airports.

In prior systems used by the pilot to ascertain that a predetermined intercept point had been reached, two separate omnirange receivers, to receive the signals from the two omnirange transmitters, and a separate course deviation indicator for each of the omnirange receivers were provided in the aircraft. By tuning each of the omnirange receivers to a respective omnirange station and selecting the desired course radials on each of the course indicators to set up the intercept point, the pilot could ascertain when an intercept point was reached by watching both of the indicators at the same time for a null or zero reading or by having another person, such as the co-pilot, watch one of the indicators and communicate the displayed information on his indicator to the pilot. Either arrangement is disadvantageous for several reasons. First of all, the use of two separate indicators introduces another meter which must be mounted on the instrument panel of the aircraft. In view of the relative complexity of present day flying and the number of instruments which must necessarily be provided on each aircraft, the extra indicator adds to the already crowded control panel and gives the pilot or co-pilot another meter to watch. This takes the pilot or co-pilot away from other tasks which are extremely important, particularly in the vicinity of the places such as airports where the intercept points are usually established.

Another disadvantage with prior art systems for establishing intercept points arises from the fact that the second omnirange receiver is usualy tuned to intercept a radial signal which is perpendicular or at a relatively large acute angle direction of aircraft flight. Because of this, the course deviation indicator connected to the second omnirange receiver only shows for a brief instant the point at which the selected radial from the second omnirange station is crossed. This occurs because the second course deviation indicator has a linear scale and meter movement which is usually restricted to only ten degrees on each side of a zero or null marking on the indicator. Therefore, as the aircraft approaches the selected course radial from the second omnirange station perpendicularly or at a relatively large acute angle, the steering pointer on the second course indicator moves very rapidly from one side of the null point to the other and passes through the zero degree or null mark, which indicates the course intercept points for only an instant. This type of meter indication makes it very difficult for the pilot to determine when the intercept point had been reached since the approach to the intercept point is indicated for only a short time. Because of this in many cases, and particularly where high speed jet aircraft are involved, intercept points are missed entirely, thereby contributing significantly to the hazards of a potential collision.

Another confusing factor arises in the two indicator system since either the pilot or co-pilot must interpret the second indicator display to see if the second omnirange station is to the left or right of the aircraft. Where the pilot is not certain whether the co-pilot has set the second omni indicator to the "TO" or "FROM," the pilot cannot be sure whether the pointer on the second needle should be to the left or right of the null mark before the intersection is reached. This also results in missed intercepts.

All of these various disadvantages are overcome by the present invention which is directed to an aircraft radio navigation instrument system in which course intercept points are established and displayed for the pilot's use in a simple and efficient manner. In accordance with the invention, a pair of omnirange receivers are provided in each aircraft, as in the prior art. Here, however, instead of using two separate indicators, one for each of the omnirange receivers, only a single indicator is utilized. In a preferred embodiment of the invention the indicator utilized has two pointers which are substantially perpendicular to each other when both are in the null position. The first omnirange receiver is tuned to one of the omnirange transmitting stations and the radial from the station is selected for the course which the aricraft is to fly. The signal received from the first station is used to control the vertical pointer of the indicator, which is the aircraft course deviation pointer in a conventional flight instrument system, in the conventional manner. Thus, the vertical pointer is provided with information from the aircraft steering computer to steer the aircraft on the course radial selected for the first omnirange receiver.

The second omnirange receiver is tuned to the second omnirange station and a course radial is selected which will establish the geographical intercept point with the course radial selected by the first omnirange receiver. The intercept point will be at the point where the two radials intercept each other. The signal from the second omnirange receiver is supplied to a horizontal pointer in the single indicator and this horizontal pointer moves as the aircraft approaches the selected course radial from the second omnirange station. Thus, a complete display is presented in a single indicator which indicates to the pilot the position of the aircraft with respect to the two selected radials and the intercept point. All that the pilot has to do to establish the intercept point is to steer the aricraft in accordance with the position of the vertical pointer. When the horizontal pointer crosses the zero reference line on the indicator, the pilot knows that he has reached the intercept point. The pilot can then initiate his flight manuever or report reaching the intersection.

In a preferred embodiment of the invention, the single indicator which is to be used is the course deviation indicator already available to the pilot for operation of his omnirange receiver and navigation system. Here, the first omnirange receiver operates the vertically positioned course deviation pointer in the conventional manner to provide steering information for the aircraft. Provision is made to apply the signals from the second omnirange recevier to the horizontal glide slope pointer which is also available to the pilot in this indicator. This glide slope pointer is normally only utilized for a very small portion of the flight, for example, the last three or four minutes when the aircraft is making an instrument landing system (ILS) approach. During the rest of the flight the glide slope needle remains inactive, including the time when the aircraft is trying to establish intercept points.

Also, in the preferred embodiment of the invention where the horizontal or glide slope pointer is to be utilized to establish the intercept points, provision is made to extend the scale of the meter displaying the second omni station signal so that the pointer will start to move when the aircraft is further away from the intercept of the second station radial. The extended portion of the scale is compressed so that non-linear movement of the pointer will result in the compressed portion while the original scale portion is left with linear movement. This arrangement is very advantageous since it enables the pilot to judge the approach of the intercept point more accurately and give him sufficient warning and time to initiate the proper action at the intercept point. The preferred embodiments of the invention is also arranged to present the same type of display and movement of the horizontal pointer whether the second omnirange station is on the left or right of the aircraft. Thus, the likelihood of the pilot becoming confused as to the location of the intercept point, because of the relative location of the second omnirange station to the left or right of the aircraft, is considerably reduced.

It is therefore an object of this invention to provide a simplified display instrument for an aircraft radio navigation system.

A further object of this invention is to provide a simplified instrument for indicating intercept points to a pilot.

Another object of the invention is to provide a single indicator on which the signals from the selected course radials received by two omnirange receivers are displayed in the form of crossed pointers.

A further object of the invention is to provide a system in which the glide slope pointer of a course deviation indicator is now controlled by a second omnirange receiver to indicate intercept points for the pilot.

Still another object of the invention is to provide a single indicator for the pilot of an aircraft in which two crossed pointers are used to display omnirange intercept points.

Yet a further object of the invention is to provide an aircraft indicator for displaying the signals received from two omnirange receivers, the signal from one of the receivers being displayed on a compressed scale for at least a portion of the display.

Another object of the invention is to provide an indicator for an aircraft in which a pointer is used to display the signals from a selected radial from an omnirange station received by an omnirange receiver on the aircraft, the movement of the pointer being made undirectional whether the station is on one side or the other of the aircraft.

Other objects and advantages of the present invention will become more apparent upon reference to the following specification and annexed drawings in which.

Figures 1, 2, 3:
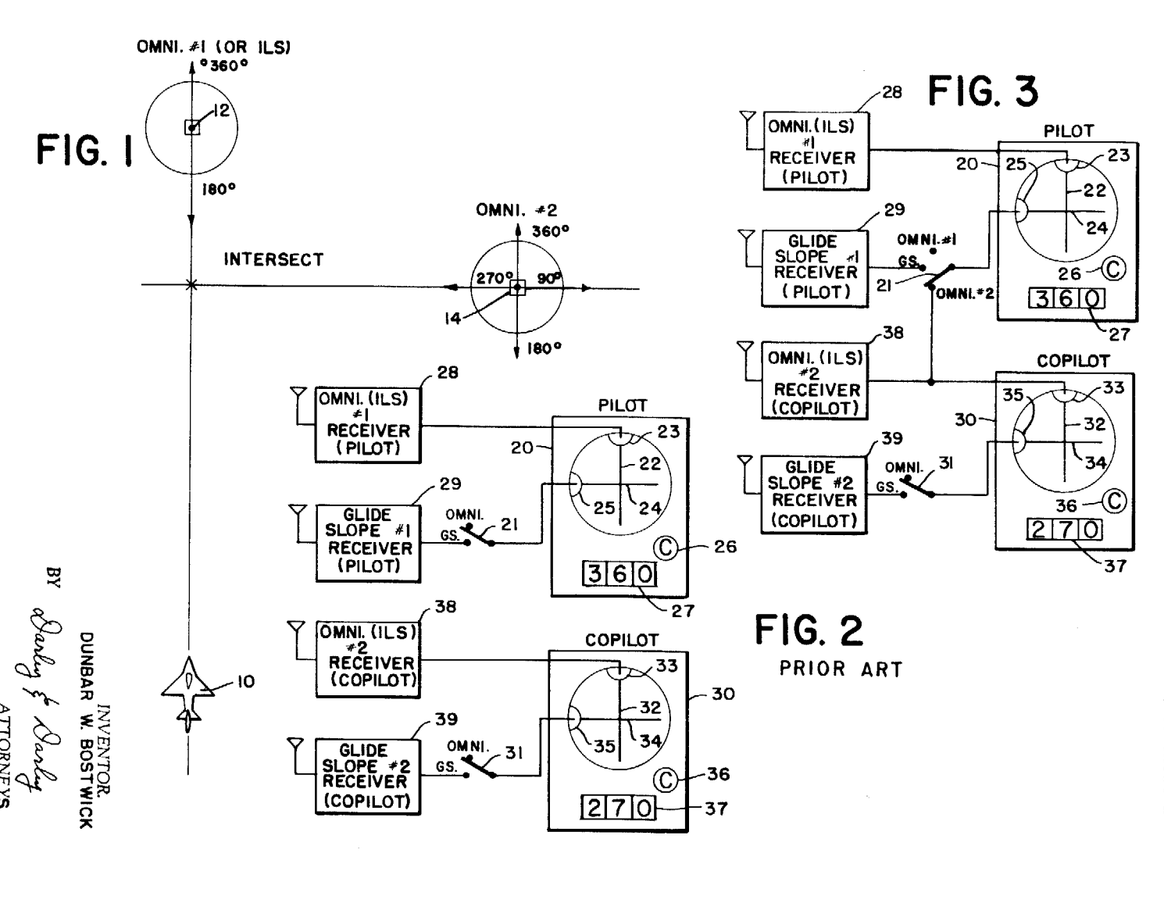
FIGURE 1 is a diagram showing an aircraft approaching an intercept point.
FIGURE 2 is a schematic block diagram of the prior art, dual installation used for establishing intercept points.
FIGURE 3 is a schematic diagram of a modification of the prior art system of FIGURE 2 for displaying the intercept points on a single indicator.

Referring to FIGURE 1 an aircraft 10 is shown which is flying a radio beam heading provided by a first omnirange station 12. The station 12 is of the type commonly used throughout the United States in which a number of radials are produced by the station transmitting two signals, one of constant phase and the other of a varying phase. These signals are transmitted as a rotating field pattern in the conventional manner. The omnirange stations used with the present invention, in themselves, form no part of the present invention. The omnirange station produces an infinite number of courses which may be visualized as radiating from the station like spokes from the hub of a wheel. These courses are known as radials and are identified by their magnetic bearing outbound from the station. A radio receiver located in the aircraft measures the phase difference between the two signals transmitted by the omnirange station 12 to produce an indication of the actual heading of the aircraft with respect to a selected omnirange radial which is to be used to establish the aircraft's course.

As shown in FIGURE 1, the aircraft 10 is illustratively flying a heading of 360° along the 180° omni radial. Flying the course of 360° will bring the aircraft to the first omnirange station 12. At some point a predetermined distance away from the first omnirange station 12, the aircraft is to reach an intercept or intersection point X. The intercept is established by a predetermined course radial transmitted by a second omnirange station 14 at the point where this radial intersects the radial from the first station 12 on which the aircraft is flying. As shown in FIGURE 1, the selected radial from the second omnirange station 14 intersects the radial from the first omnirange station 12 at an angle of 90°. Any suitable radials can be selected which form a suitable intersect angle. In practice, the intersect angles are usually made acute but relatively large, i.e. in the neighborhood of 25° or more.

When the aircraft 10 of FIGURE 1 is of relatively large size, for example a commercial jet transport, it will usually contain a dual omnirange receiver installation and a dual instrument installation for displaying information received. A typical installation of this type is shown diagrammatically in FIGURE 2 in which a first course indicator instrument 20 is located in front of the pilot of the aircraft and a second course indicator 30 located in front of the co-pilot. The indicators 20 and 30 may be of any suitable type which are commercially available, for example the type given the military designation ID-249. Only those portions of the course indicator which are pertinent to the present invention are shown. Other parts of the indicator, for example, the heading pointer, compass ring, warning flags, etc., are omitted for purposes of clarity.

Each of the indicators 20 and 30 have a respective course deviation pointer 22 and 32 and a glide slope needle or pointer 24 and 34. These pointers are moved by the respective meter movements 23, 25 and 33, 35. The course indicators 20 and 30 also have respective course set knobs 26 and 36 which are used to set the desired omnirange radial into a respective window 27 and 37. These course set knobs 26 and 36 are generally referred to as the OBS knobs. However, the more general description of course set knob is used here.

In order to position the course deviation pointers 22 and 32, the respective omnirange radio receivers 28 and 38 are provided. These receivers are of any standard type for example, the type known by the military designation AN/ARN-14, or the Collins Radio Corporation 51-R receiver. The function of the receivers 28 and 38 is to receive the signals transmitted by the omnirange stations and measure the phase difference therebetween. The receivers also receive a reference voltage from a synchro or resolver which is operated by a respective course set knob. This reference voltage varies in accordance with the omnirange course radial selected by the course set knob. The reference signals and the received omnirange signals are compared in the receiver and the resultant signal is used to move the course deviation pointer in a direction and a proportionate amount to the right or left of the null point corresponding to the direction in which the pilot is to fly the aircraft to obtain the desired heading.

If the aircraft is equipped with a steering computer, the meter controlling the course deviation pointer also receives a signal from the aircraft gyro or other similar device which indicates the attitude of the aircraft. This attitude signal is mixed with the omnirange receiver signal in the aircraft steering computer. A suitable steering computer is manufactured by the aforesaid Collins Radio Company under the designation 562A. Of course, any suitable steering computer may be utilized. It should be understood that many aircraft do not have steering computers. However, the present invention is capable of being used with any omnirange navigation system, whether or not a steering computer is used. By steering the aircraft to keep the course deviation pointer 22 centered, the pilot can fly the aircraft on any selected omnirange course, for example, the 360° course shown in the window 27 of indicator 20. All of this operation is conventional and is performed by conventional equipment.

The respective glide slope pointers 24 and 34 are driven by signals picked up by glide slope receivers 29 and 39. The outputs of these receivers are respectively connected to the glide slope meters 25 and 35 through the respective switches 21 and 31. The switches 21 and 31 are illustratively shown as having two positions, an omni position and a glide slope (GS) position.

The glide slope receivers are operative to move the glide slope pointers 24 and 34 only when the switches 21 and 31 are in the GS position. This occurs when the aircraft is coming in for an instrument landing approach. In the usual situation, the glide slope receivers are only utilized for a few minutes during the flight. Thus, the glide slope needles 24 and 34 also remain inactive except for that brief period when the pilot is landing the aircraft.

When both omnirange receivers 28 and 38 are tuned to the same omnirange station and both course set knobs (OBS) 26 and 36 are set to select the same omni heading, the indicators 20 and 30 will have the same display. With the dual flight instrument system of FIGURE 2, the pilot and co-pilot would cooperate to determine when the intercept point X of FIGURE 1 is reached in the following manner. The pilot tunes the first receiver 28 to the frequency of the first omnirange station 12, and sets his course selector knob 26 to fly the desired course. This is shown as being 360° for illustrative purposes. By keeping the course deviation pointer 22 centered, the desired course of 360° is flown. At the same time, the co-pilot tunes the second omnirange receiver 38 to the frequency of the second omni station 14. The co-pilot then turns the course selector knob 36 to 270° to indicate the desired course radial which is to intersect the selected radial from the first omnirange station 14.

As the aircraft 10 of FIGURE 1 approaches the intercept point X, the co-pilot's course deviation pointer 32 swings from one side of the indicator to the other passing rapidly through the center position. The intercept is reached when both course deviation pointers 22 and 32 of the indicators 20 and 30 are centered. However, this is difficult to ascertain particularly because the course deviation pointer 32 of the second indicator 30 swings through an angle of only about 20° and this angle is subtended rather rapidly as the aircraft is flying across the selected radial from the second omnirange station 14. Also, in order to establish the intercept point, the co-pilot must be in voice contact with the pilot and/or the pilot must be watching both indicators at the same time. This is rather difficult, especially in a large aircraft having numerous instruments which the pilot must monitor. This problem is magnified when the aircraft is in a heavy traffic area, such as in the proximity of a landing pattern near an airport.

FIGURE 3 shows a diagrammatic illustration of a simplified embodiment of the present invention in which intercepts may be displayed on a single course indicator, preferably located in front of the pilot. In this embodiment, similar components used in FIGURE 2 bear the same reference numerals. In the embodiment of FIGURE 3, the switch 21 adjacent one of the indicators, preferably the pilot's, now has three positions designated as "omni 1," "GS" and "omni 2." The switch 31 adjacent the indicator 30 still has the same two position omni and GS. When the pilot is flying a normal omni course and does not wish to establish intercepts, he throws switch 21 to the "omni 1" position. The first receiver 28 operates in the normal manner and the aircraft is steered in the normal manner to center the course deviation pointer 22. This places the aircraft on the desired course shown in the window 27, as selected by the course set knob 26. During this time, the glide slope needle 24 is inoperative and remains in the center position of the indicator. When the aircraft is ready for a landing, the pilot turns switch 21 to the GS position thereby activating the glide slope pointer 24.

When the pilot desires to establish the intercept points, such as point X of FIGURE 1, the following procedure is followed. First, the first omnirange receiver 28 is tuned to the frequency of the first omnirange station 12. The desired course is set into the window 27 by the course set knob 26 and the pilot flies the aircraft to center the pointer 22 in the conventional manner. Switch 21 is now set to the "omni 2" position so that the signal from the second omnirange receiver 38 is supplied to the meter 25 which actuates the glide slope pointer 24 on the first indicator. At the same time, the course selector knob 36 of the second indicator 30 is set to the intercept course radial of 270°. Because the glide slope pointer 24 is now actuated by the second omnirange receiver 38, it will be centered when the aircraft crosses the selected radial from the second omnirange station 14. The course deviation pointer 32 of the second indicator 30 may be left connected during this time or it may be disconnected if desired. The switch 31 also inactivates the glide slope pointer 34 of the second indicator unless it is tuned GS.

The embodiment of FIGURE 3 enables the pilot to determine the intercept point X in a relatively simple manner. First, the pilot flies the plane to center the course deviation pointer 22 in the normal manner to establish the selected omnirange course as set by the course selector knob 26. At the same time the aircraft is flying along the selected course, the glide slope pointer 24 gives an indication of the position of the aircraft with respect to the selected radial from the second omnirange station 14. Thus, pointer 24 moves from either above or below its center position towards the center of the indicator as the aircraft approaches the selected radial from the second station. The intercept point is reached at the time the course deviation pointer 22 and the glide slope pointer 24 are centered vertically and horizontally respectively. Both of these conditions are visually apparent by means of suitable scales or positioning dots which are placed on the indicators.

By using the embodiment of FIGURE 3, a pilot can tell at a glance by watching only a single indicator when an intercept point is reached. Also, no action is needed by the co-pilot in order to establish an intercept so he may be free to perform other duties.

Figure 4:
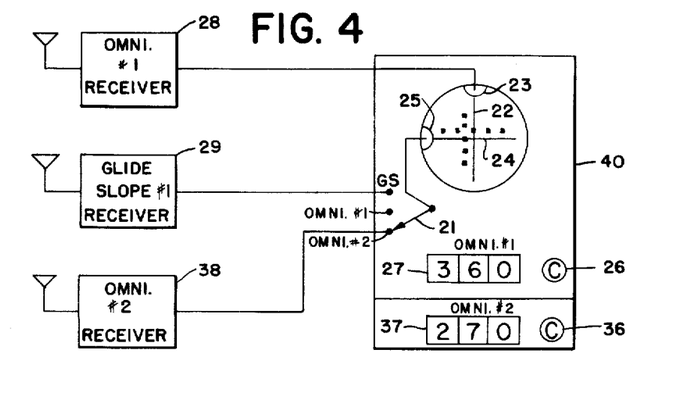
FIGURE 4 is a schematic diagram of a system for a single installation in which only one indicator is provided.

The presentation of intercept points by a single indicator such as shown in FIGURE 3 is particularly advantageous in small aircraft where there is only a single pilot. In this type of aircraft, several of the components of the embodiment of FIGURE 3 may be omitted, as shown in FIGURE 4. Here, the indicator 40 has only a single course deviation pointer 22 and glide slope indicator pointer 24. The indicator 40 is provided with a first course set knob 26 and course display window 27 which operate in conjunction with the first omnirange receiver 28. The indicator 40 also has a second course set knob 36 and course set indicator window 37 which operate in conjunction with the second omnirange receiver 38.

With the switch 21 located in the "omni 1" position, the pointer 22 is actuated only by the first omnirange receiver 28 and the pilot steers the aircraft in the normal manner without any glide slope signal being present to actuate the glide slope pointer 24. When switch 21 is in the GS position, omnirange receiver 28 receives instrument landing signals to deflect the course deviation pointer 22. The glide slope needle 24 is deflected up and down by the received glide slope signals. When the switch 21 is turned to the "omni 2" position, the signals received by the second omnirange receiver 38 are applied to the glide slope pointer 24. Thus, as the aircraft approaches the selected course radial from the second omnirange transmitter 14, the glide slope pointer 24 is deflected in accordance with the position of the aircraft with respect to the selected radial. The pilot has an indication of reaching the intercept point by the two pointers of the single indicator being centered in the manner described above.

In the embodiments of the invention heretofore described in FIGURES 3 and 4, no provision has been made to make the pointer 24 move in any one predetermined direction when the course radial from the second station is approached. Therefore, the pilot does not know in many cases whether he is approaching or has already passed the intercept point. Of course, it would be highly desirable for the pilot to look at his indicator and to determine merely by noting the direction of movement of pointer 24 whether he is approaching or has already passed the course radial from the second station. Also, it would be desirable to provide the pilot with as much advance warning as to the approach of the intercept of the second course radial as possible.

Figure 5:
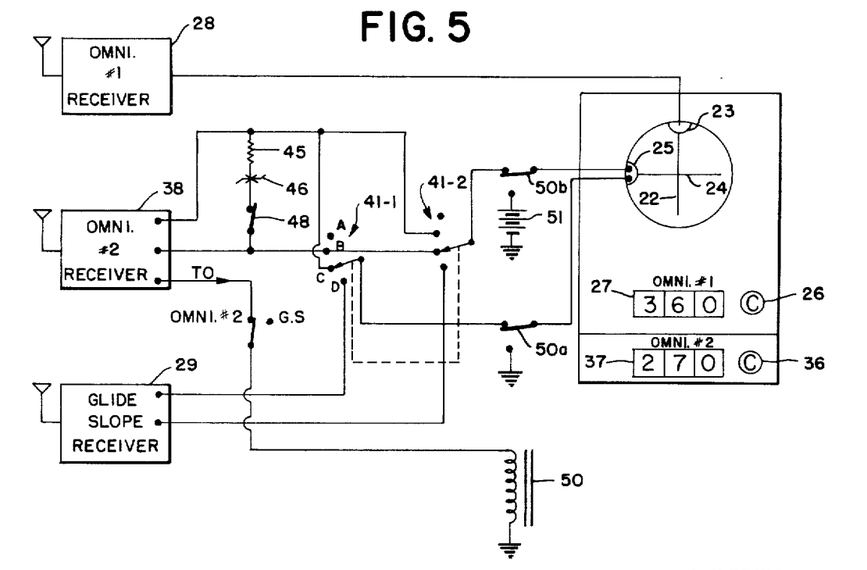
FIGURE 5 is a schematic diagram of a preferred embodiment of the invention in which provision is made for enlarged meter scale movement and for providing unidirectional movement of the horizontal pointer as the course radial from the second station is selected.

FIGURE 5 shows a preferred embodiment of the invention wherein provision is made for the actuation of the horizontal pointer 24 in a region greater than normal to provide an indication of the aircraft approaching the second course radial from a further distance than would normally be indicated on a conventional meter. Also, provision is made so that the pointer 24 will always move in the same direction when the course radial from the second station is approached thereby eliminating several confusing aspects previously encountered in establishing the intercept points.

In FIGURE 5, those elements which are the same as in the other embodiments of the invention have been indicated by the same reference numerals. Here as in FIGURE 4, the course set knob 26 is turned to put a course heading of 360° into the window 27, as is consistent with the intercept example of FIGURE 1. As described before, the output of the first omnirange receiver 28 operates the vertical course deviation pointer 22 to indicate the position of the aircraft with respect to the selected radial from the first omnirange station 12. The pilot steers the aircraft to center the pointer 22 in the conventional manner.

The signals to actuate the horizontal glide slope pointer 24 originate, as in the previous embodiments, from either the glide slope receiver 29 or from the second omnirange receiver 38. Signals are applied to the meter 25 which moves pointer 24 through a two deck, four position switch having the respective decks 41–1 and 41–2, each deck having the switch positions a, b, c, and d. The various switch positions correspond to the following modes of operation:

a—omni 1
    b—omni 2 LEFT
    c—omni 2 RIGHT
    d—Glide slope When switch 41 is turned to the "a" position, only the vertical course deviation pointer 22 is actuated. This is done by the signals from the first omnirange receiver 28 in the conventional manner.

When switch 41 is turned to the "d" position, signals from the glide slope receiver are applied to the meter 25 through the "d" contacts of the two switch decks. In this mode of operation, the pointer 24 is controlled by the output signals from the glide slope receiver 29 in the conventional manner for an instrument landing approach.

With switch 41 in either the "b" or "c" positions, the glide slope pointer 24 is actuated by the second omnirange receiver 38. In the preferred embodiment of the invention, it is desired to have the pointer 24 move in the same direction no matter from what direction the second course radial is being approached. Thus, when the system is being used to establish intercept points, it is preferred that the pointer 24 move from the top of the indicator, down through the null point which indicates that the second radial has been crossed, and finally to the bottom of the indicator. If desired, the reverse movement may be used. It is also desired that the pointer 24 start to move at a substantial distance prior to the time that intercept point is reached in order to aid the pilot in establishing the intercept points. This is accomplished in the embodiment of FIGURE 5 by a zener diode circuit.

In order that the pointer 24 may move in the same direction no matter from what direction the craft approaches the second station radial the pilot tunes the second receiver 38 to the frequency of the second omnirange station. The course set knob 36 is then turned to set the proper outbound course radial from the second station into the window 37. In the example being described, this is the 270° radial. With the second receiver 38 operating in the maner described, the receiver 38 would measure the received signals and actuate the FROM portion of a TO-FROM indicator (not shown). This indicator shows that the aircraft is proceeding outbound (FROM) from the station. The production of the TO-FROM signal and the TO-FROM indicator are conventional and, in themselves, form no part of the present invention.

With the second omnirange receiver 38 set to operate in the manner described, the D.C. voltage produced by the receiver's phase comparator and converter is of one polarity or the other depending upon whether the second omnirange station is to the left or right of the aircraft. Therefore, the receiver output voltage could move pointer 24 either up or down, depending upon the location of the station 14. The switch 41 positions "b" and "c" provide a means for reversing the connectors of the output leads of the receiver 38 to the meter 25 so that the voltage from receiver 38 is always of the proper polarity to drive the pointer 24 in the same direction as the second course radial (270°) is being approached.

In operating the system to establish the intercept point by the pointer 24, the pilot turns the course set knob 36 for the second receiver 38 to the desired course radial. The switch 41 is then set to the "b" or "c" positions which correspond to the second omnirange station being to the left or the right of the aircraft. The correct setting of switch 41 is determined by the pilot after he consults standard maps or logs which show the respective position of the various omnirange stations. The left-right switch positions "b" and "c" apply the voltage from the receiver 38 to the meter 25 so that the pointer 24 will always move in the same direction as the selected course radial from the second omni station is approached. In the example being described, the switch 41 is turned to the "c" position corresponding to the second station 14 being to the right of the aircraft.

The output voltage to the receiver 38 is applied to the terminals of the meter 25 to make the pointer 24 start moving in a predetermined direction, which indicates that the second course radial is being approached by the aircraft. In the preferred form of the invention, the pointer 24 starts at the top of the indicator, moves toward the center as the second course radial is approached, and then moves to the bottom of the indicator as the radial is passed. This is believed to be the most realistic form of presentation and the least confusing for the pilot. By establishing a predetermined mode of pointer movement as a convention for second radial approach, many causes of faulty interpretation of the indicator to determine the intercept points are eliminated since the pilot always knows in which direction the pointer 25 should be moving as the second station radial is approached. This eliminates many missed approaches. It should be understood that while the connections of the switch 41 to the meter 25 is made in each aircraft to preferably have the top to bottom pointer 24 movement, the pointer can be made to move from bottom to top as the second course radial is approached, if desired. However, this type of pointer movement is believed to be more confusing.

If, in the example being described, switch 41 is set to the "b" (OMNI-LEFT) position, then the pointer 24 would move from the bottom to the top of the indicator since the station is to the right. When this type of pilot error occurs, the resultant display would be confusing. However, the movement of pointer 24 toward the center of the indicator would still tell the pilot that he was approaching the second course radial.

It should be understood that the top to bottom movement of the pointer 24 would be obtained in the example if the switch 41 is set to the "c" (OMNI-RIGHT) position and the course set knob to a radial of 90°. In this mode of operation, the receiver 38 would be producing a TO signal to operate the TO portion of the TO-FROM indicator. Since in a preferred form of the convention it is desired to operate the pointer 24 only on outbound (FROM) radial indications, in order to establish a standard operating convention, the TO signal is preferably used to disable the pointer 24. This is accomplished, for example, as shown in FIGURE 5 by the relay 50 whose armature is connected to and energized by the receiver 38 TO output line. The relay has two contacts 50a and 50b which are in series circuit connection with the two leads to meter 25. With the receiver 38 producing a FROM signal, the relay 50 is de-energized, and the circuit is connected between the receiver 38 and the meter 25. The system operates as previously described. When an inbound (TO) course radial from the second station is tuned and the TO signal is produced by the receiver 38, the relay 50 is energized. This opens the connections between the receiver and meter 25 and contact 50a grounds one side of the meter. The other contact 50b places a voltage from a battery 51 onto the other meter lead. This deflects the pointer 24 to one side and indicates to the pilot that the course knob 36 is not properly set. The pilot would then return the course knob 36 to the correct outbound radial from the second station.

To provide the pilot with a better indication of the approach to the second course radial, a meter scale expanding circuit is used. This circuit is formed by the resistor 45 and a double anode zener diode 46. The circuit is placed across the two output lines from the receiver 38 by the switch 48. When the switch 48 is open the pointer 24 is driven in the normal manner. This usually means a pointer movement and indication of ±10° on each side of the central null point, meaning an indication of the aircraft being ±10° on either side of the second radial.

When switch 48 is closed, the zener diode 46 is in the circuit. The zener diode is selected to have a conduction point in response to voltages produced by receiver 38 corresponding to angles of approach to the second radial of greater than ±10°. As should be clear, as the angle of approach to the radial increases, the output voltage of the receiver also increases. Thus, the diode 46 is selected to conduct when the receiver 38 produces a voltage corresponding to an angle of greater than ±10° to the radial. When the aircraft is less than ±10° from the radial the diode does not conduct and the pointer 24 moves in the normal manner. Beyond the ±10° range, the pointer moves because of the diode conduction action but the movement is compressed. This means that the pointer 24 will move slowly on each side of the null point say from 20° to 10°. From 10° to 0° on each side of the null point the pointer moves in the normal manner.

It should be understood that the conduction point of diode 46 may be selected, by selecting the proper diode, to provide the meter movement starting at any angular position of the craft with respect to the second radial. The resistor 45 is chosen to vary the scale movement over the compressed range of operation in a desired manner.

Therefore it can be seen that the embodiment of the invention shown in FIGURE 5 provides a simplified and improved display for establishing intercept points in a manner which eliminates many of the errors of interpretation for the pilot since the pointer 24 always moves in the same direction during an approach toward the second course radial. Also, the expansion of the meter scale operation provides the pilot with a better picture of the approach and gives him advance warning as to the approach of the second course radial. This gives the pilot a better opportunity to respond and more warning as to the crossing of the second course radial.

While the present system has been described with respect to two omnirange receivers it should be recognized that it will also operate with localizer signals during an instrument landing approach or with visual aural (VAR) facilities. This is a conventional operation since, in these types of approach, the course deviation indicator is operated by the localizer signals or by the VAR signals. In these cases, the pilot tunes the first omnirange receiver to the localizer or VAR facility and steers the aircraft in accordance with the position of the course deviation needle. The second omnirange receiver is still tuned to the second omnirange station to deflect the pointer 24 and establish the intercept points in the manner previously described.

Figure 6:
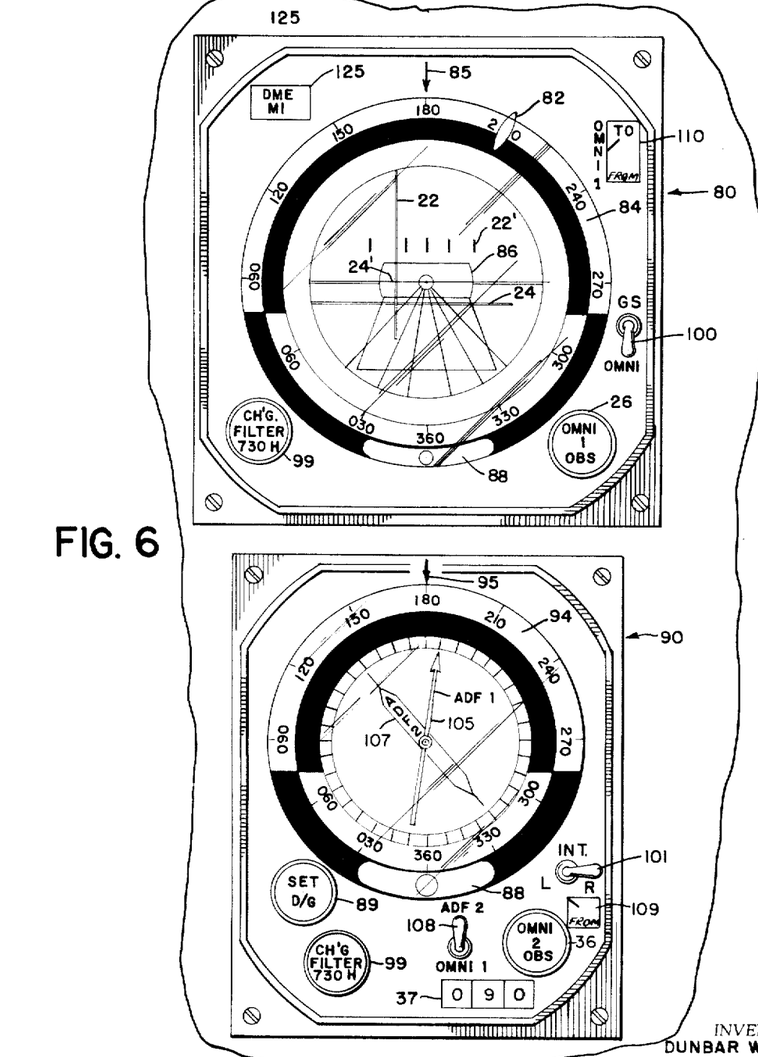
FIGURE 6 is a front view of the instruments and instrument presentation in accordance with another embodiment of the invention.

FIGURE 6 shows another type of instrument presentation using the principles of the present invention. Here, a complete flight instrument presentation is given including the magnetic compass, automatic radio direction finders, artificial horizon and turn and bank indicators. This arrangement includes a first indicator 80, to be mounted on the control panel of the aircraft, which houses the vertical course deviation pointer 22 and meter movement (not shown) and the horizontal glide slope pointer 24 and meter movement (not shown). The indicator 80 also has a central null scale line 24' for the horizontal pointer 24 and a number of scale markings 22' angularly positioned across the face of the indicator for the vertical pointer 22. A course set knob (OBS) 26 is provided for the first omnirange receiver. Here, however, instead of displaying the selected course radial in a window a "bug" 82 is moved by the knob around and with a compass card 84. The compass card 84 is either slaved and driven by the aircraft's gyro stabilized magnetic compass or other suitable type of compass (not shown) which indicates the magnetic heading of the aircraft, under a pointer 85. Alternatively the compass card can be operated as a repeater indicator by the aircraft's directional gyro or, it can be operated manually without the use of either a connected gyro or compass. An artificial horizon 86 is also shown which is controlled by the gyro in the aircraft in the conventional manner to indicate the attitude of the aircraft with respect to the horizon. A "window type" horizon display is preferably used which presents a picture of the horizon that the pilot would see if he were looking out of his window. A conventional slip indicator 88 is also provided.

The second indicator 90 has the course set knob 36 for the second omni receiver which digitally displays the selected course radial from the second station in the window 37. Indicator 90 also has a compass card 94 and a stationary marker 95, if desired. The indicator 90 also preferably houses a slip indicator 88 for the pilot's convenience and a directional gyro set knob 89 to set both compass cards 84 and 94 when the directional gyro is to control these elements. Of course, the compass card 82 in the first indicator 80 does not have to be slaved, and as explained before, the compass cards can be manually rotated. In fact, both cards 84 can be made stationary if the pilot is not provided with relative bearing and heading information to selected points.

In a preferred embodiment of the invention the appropriate components of both indicators 80 and 90, such as the artificial horizon for example, are of the vacuum driven type, for example similar to the horizon reference type "100" manufactured by Aviation Instrument Manufacturing Corp. of 9033 Monroe Road, Houston 17, Texas. Both of the indicator 80 and 90 are therefore preferably provided with "cigar shaped" filters 99 which are screwed into the face of the instrument and where filter elements are in the air stream of the vacuum. The filters preferably bear written designations of the time, in aircraft flying hours, at which the filter is to be changed.

Figure 6A:
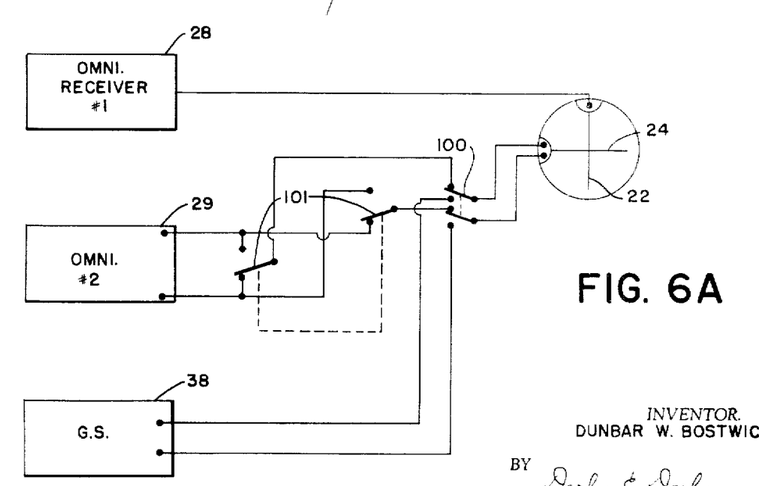
FIGURE 6A is a wiring diagram for a part of the instruments of FIGURE 6.

The functions of switch 41 of FIGURE 5 are broken into two parts so that indicator 80 has a switch 100 which switches the operation of pointer 24 from glide slope (GS) to the "omni 2" mode of operation. The left-right intersection switch 101 is located on the second indicator 90. The wiring diagram for these two switch connections is shown in FIGURE 6A. Of course, the zener diode scale expander circuit of FIGURE 5 may be used when switch 100 is in the "omni 2" mode of operation.

The second indicator 90 also has first and second automatic direction finder pointers (ADF) 105 and 107 which are driven by two automatic direction finder receivers, for example of the ARN-7 or ARN-6 type. The second ADF pointer 107 may be connected by a switch 108 to point the direction to the selected course radial from the first omnirange station. The second indicator also has a TO-FROM type meter 109 which indicates the mode of operation of the second omni receiver. If it is desired that the second omni receiver operate in the FROM mode only, the TO portion of meter 109 may be removed, if desired. A similar TO-FROM meter 110 is provided on the first indicator 80 to indicate the operating mode of the first omni receiver.

Figure 6B:
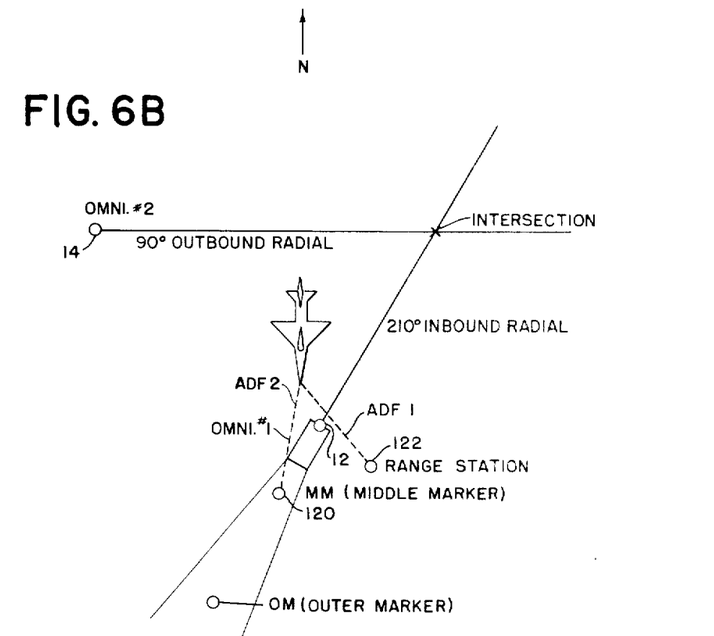
FIGURE 6B is a diagram illustrating certain principles of operation of the embodiment of the invention of FIGURE 6.

As shown in FIGURE 6B, the aircraft is flying a course to make an omni approach onto a runway having a bearing of 210°. Thus, the course set knob 26 has been tuned to position the first "bug" 82 over the 210° point on the compass card 82. The aircraft is to establish an intercept point with the outbound 90° radial from a second omni station 14 to the right of the aircraft. This second radial was set into the window 37 by the course set knob 36. Since the intercept was to be established with the second omni station 14 to the right, switch 100 was turned to the "omni 2" position and switch 101 to the "INTERCEPT RIGHT" position.

In FIGURE 6B, the aircraft is illustratively shown as flying a course of 180° and has already passed the intercept point. The omni course radial of the first station 12 is also to the left of the aircraft. Thus, the first omni TO-FROM indicator 110 is in the TO position while the second omni TO-FROM indicator 109 is in the FROM position. The course deviation pointer 22 is to the left of the indicator null marking indicating to the pilot that he must fly to the left to make the first omni course. The horizontal pointer is below the central scale line 24' of the indicator showing that the intercept has already been passed.

The compass cards 84 and 94 are shown with the 180° course marking under the respective pointers 85 and 95. This indicates the magnetic heading of the aircraft. The first automatic radio direction finder is tuned to the middle marker (MM) station 120 of the runway approach. Since this station is at a magnetic bearing of about 190°, the pointer 105 moves to indicate that location. Similarly the switch 108 connects the second automatic direction finder to the ADF position and the receiver is tuned to a TACAN range station 122 at a magnetic bearing of about 140° so the second pointer 107 points to the bearing. If desired, a distance measuring indicator 125 (DME) may be mounted in the first indicator 80 to show the distance of the aircraft to range station 122. An outer marker (OM) station is also located on the runway approach and the first automatic radio direction finder may be tuned to the frequency of this station at the proper time. All of the operations of automatic direction finders, magnetic compass, and distance measuring equipment are conventional and no further description is needed.

The control panel display of FIGURE 6 gives the pilot all of the information necessary for steering the aircraft in two instruments which may be placed in front of him. This effects a considerable reduction over the number of instruments which are currently being used in present day aircraft and eliminates several confusing aspects of aircraft radio navigation.

Although a particular structure has been described, it should be understood that the scope of the invention should not be considered to be limited by the particular embodiments of the invention shown by way of illustration, but rather by the appended claims.

What is claimed is:

1. An aircraft instrument system for indicating the intercept point of selected first and second course radial signals each having positional information and transmitted from respective first and second omnirange stations comprising on said aircraft a single indicator having course deviation and glide slope indicating means, said glide slope indicating means being normally operative by signals received by a glide slope receiver, means for respectively receiving said first and second course radial signals, means for applying said received selected first course radial signal to said course deviation indicating means to provide an indication corresponding to the location of the aircraft with respect to the positional information of said selected first course radial signal, and means for applying said received second course radial signal to said glide slope indicating means to provide an indication corresponding to the approach of the aircraft with respect to the positional information of said selected second course radial signal.

2. An aircraft instrument system for indicating the intercept point of selected first and second course radial signals each having positional information and transmitted from respective first and second omnirange stations comprising on said aircraft a single indicator having course deviation and glide slope indicating means, said glide slope indicating means being normally operative by signals received by a glide slope receiver, means for respectively receiving said first and second course radial signals, means for applying said received selected first course radial signal to said course deviation indicating means to provide an indication corresponding to the location of the aircraft with respect to the positional information of said selected first course radial signal, means for disconnecting the glide slope receiver from said glide slope indicating means, and means for applying said received second course radial signal to said guide slope indicating means to provide an indication corresponding to the approach of the aircraft with respect to the positional information of said selected second course radial signal.

3. An aircraft instrument system for indicating the intercept point of selected first and second course radial signals each having positional information and transmitted from respective first and second omnirange stations comprising on said aircraft a single indicator having respective course deviation and glide slope pointer means which are normally mounted in respective vertical and horizontal positions, said glide slope pointer means being normally operative to be positioned by signals received from a glide slope receiver, means for disconnecting the glide slope receiver signals from said glide slope pointer means, first and second means for respectively receiving the selected first and second course radial signals respectively transmitted by said first and second omnirange stations, means for applying said received selected first course radial signal to said course deviation pointer means to position the same corresponding to the location of the aircraft with respect to the positional information of said selected first course radial signal, and means for applying said received second course radial signal to said glide slope pointer means to position the same corresponding to the approach of the aircraft with respect to the positional information of said selected second course radial signal, said course deviation and glide slope pointer means having a predetermined positional relationship when the aircraft reaches the point where the first and second course radials intercept.

4. An aircraft instrument system for indicating the position of an aircraft at a geographical location established by the intersection of course radial signals each having positional information and transmitted by respective first and second omnirange stations comprising on said aircraft omnirange receiver means for receiving the respective course radial signals transmitted by said first and second omnirange stations, means connected to said receiver means for selecting a respective course radial signal transmitted by each station, a single indicator having horizontal and vertical pointers, means responsive to the signals received by said receiver means for producing respective first and second signals corresponding to the angular position of the aircraft with respect to the positional information of the selected course radials received from the first and second stations, means for applying said first signal to said vertical pointer to position the same to indicate the aircraft heading with respect to the positional information of the selected radial from the first station, and means for applying said second signal to the horizontal pointer to position the same to indicate the angular position of the aircraft with respect to the positional information of the selected radial from the second station.

5. An aircraft instrument system for indicating the position of an aircraft at a geographical location established by the intersection of course radial signals each having positional information and transmitted by respective first and second omnirange stations comprising on said aircraft omnirange receiver means for receiving the respective course radial signals transmitted by said first and second omnirange stations, means connected to said receiver means for selecting a respective course radial signal transmitted by each station, a single indicator having horizontal and vertical pointers, means connected to said receiver means and responsive to the signals received by said receiver means for producing respective first and second signals corresponding to the angular position of the aircraft with respect to the positional information of the selected course radials received from the first and second stations, means for applying said first signal to said vertical pointer to position the same to indicate the aircraft heading with respect to the positional information of the selected radial from the first station, and means for applying said second signal to the horizontal pointer to position the same to indicate the angular position of the aircraft with respect to the positional information of the selected radial from the second station, said last named means including means for applying said second signal to said horizontal pointer to position the same in the same predetermined direction irrespective of the location of the second omnirange station with respect to the aircraft.

6. An aircraft instrument system for indicating the position of an aircraft at a geographical location established by the intersection of course radial signals each having positional information and transmitted by respective first and second omnirange stations comprising on said aircraft omnirange receiver means for receiving the respective course radial signals transmitted by said first and second omnirange stations, means connected to said receiver means for selecting a respective course radial signal transmitted by each station, a single indicator having horizontal and vertical pointers, means connected to said receiver means and responsive to the signals received thereby for producing respective first and second signals corresponding to the angular position of the aircraft with respect to the selected course radials received from the first and second stations, means for applying said first signal to said vertical pointer to position the same to indicate the aircraft heading with respect to the positional information of the selected radial from the first station, means for applying said second signal to the horizontal pointer to position the same to indicate the angular position of the aircraft with respect to the positional information of the selected radial from the second station, and means for increasing the operating range of the horizontal pointer, said last named means also serving to compress a portion of the positioning movement of said horizontal pointer.

7. An aircraft instrument system for indicating the position of an aircraft at a geographical location established by the intersection of course radial signals each having positional information and transmitted by respective first and second omnirange stations comprising on said aircraft omnirange receiver means for receiving the respective course radial signals transmitted by said first and second omnirange stations, means connected to said receiver means for selecting a respective course radial signal transmitted by each station, a single indicator having horizontal and vertical pointers, means connected to said receiver means and responsive to the signals received thereby for producing respective first and second signals corresponding to the angular position of the aircraft with respect to the selected course radials received from the first and second stations, means for applying said first signal to said vertical pointer to position the same to indicate the aircraft heading with respect to the positional information of the selected radial from the first station, means for applying said second signal to the horizontal pointer to position the same to indicate the angular position of the aircraft with respect to the positional information of the selected radial from the second station, said last named means including means for applying said second signal to said horizontal pointer to position the same in the same predetermined direction irrespective of the location of the second omnirange station with respect to the aircraft, and means for increasing the operating range of the horizontal pointer, said last named means also serving to compress a portion of the positioning movement of said horizontal pointer.

8. An aircraft instrument system as set forth in claim 1 and further comprising means connected to one of said indicating means for increasing its range of operation, said last-named means compressing a portion of the indication provided by said one indicating means when the aircraft is located within a predetermined range of locations with respect to the selected course radial signal operating said one indicating means.

9. An aircraft instrument system as set forth in claim 1 and further comprising means connected to said glide slope indicating means to provide a unidirectional indication of approach of the aircraft with respect to the positional information of said selected second course radial signal.

References Cited by the Examiner

UNITED STATES PATENTS

| | | | |
|---|---|---|---|
| 2,252,699 | 8/1941 | Byrne | 343—106 |
| 2,365,949 | 12/1944 | Greene | 343—112 |
| 2,613,352 | 10/1952 | Kellogg | 343—107 |
| 2,632,421 | 3/1953 | Perkins | 343—107 |
| 2,644,941 | 7/1953 | Kellogg | 343—107 |

CHESTER L. JUSTUS, *Primary Examiner.*

LEWIS N. MYERS, *Examiner.*

T. H. TUBBESING, H. C. WAMSLEY,
*Assistant Examiners.*